United States Patent Office 3,355,548
Patented Nov. 28, 1967

3,355,548
DATA TRANSMITTING SYSTEM WITH DATA REPRESENTED BY COMBINATIONS OF DIFFERENT PULSE AND D.C. SIGNALS
Richard M. Hodge, Marion, Iowa, assignor to Collins Radio Company, Cedar Rapids, Iowa, a corporation of Iowa
Filed June 29, 1965, Ser. No. 468,019
17 Claims. (Cl. 178—68)

This invention relates generally to a data transmission system and, more particularly, to a relatively simple communication system comprising a transmitting means and a receiving means for transmitting and receiving a limited number of characters or instructions.

There are in the prior art many different circuit means for generating and transmitting information from one station to another. Most of these systems comprise complex structures as, for example, a teletype system. As another example, modern data processors generate and transmit information in the form of characters composed of binary bits. Such structures are highly sophisticated and are capable of encoding and transmitting any type intelligence that is capable of being reduced to recorded form.

There are, however, certain situations where it is desirable to encode and transmit only a few instructions, primarily for the purposes of control. As an example, in the control of a television receiver by remote means, it may be desirable only to turn the set on and off, to select channels, to vary volume, to adjust brightness, and to vary the contrast of the receiver. In other applications different instructions would be needed. The important consideration is that only a few instructions are needed and a relatively complex form of encoding and transmitting such instructions is not required.

An object of the invention is a simple and inexpensive communication system applicable where only a few characters are needed.

A second object of the invention is to provide a reliable communication system, especially suitable for use in applications where only a relatively small number of instructions are required and where it is desired to transmit said instructions over a single wire.

A third purpose of the invention is a system for providing remote control of a device.

A fourth object of the invention is the improvement of remote control systems, generally.

In accordance with the invention, there is provided a transmitting means, a transmission means, and a receiving means. The transmitting means is constructed to produce a limited number of separately identifiable signals and, more specifically, comprises an A-C signal source having two output leads and constructed to produce on one of the two output leads the positive half cycles of the A-C signal source, and on the other output lead the inverted negative half cycles of the A-C signal source. Thus, a train of pulses appears on both output leads with the pulses being interleaved in time.

The transmitting means also includes a D-C source constructed to supply one of two D-C potentials to the transmission means connecting the transmitter and receiver.

Individual switching means are provided for the two output leads of the A-C signal source and also for the D-C source to selectively connect any of the outputs, either singly or any combination, of the A-C source and the D-C source to the single line transmission means connecting the transmitter to the receiver.

The receiver comprises a means for producing a first and a second train of interleaved pulsating synchronizing signals. The first train of synchronizing pulses is caused to be phase synchronous with the received A-C signal derived from the positive half cycles of the A-C source located at the transmitter, and the second train of pulsating synchronizing signals is cause to be phase synchronized with the received A-C signal derived from the negative half cycles of the A-C source located at the transmitter site.

The receiver also includes first detecting means responsive to the composite signal (A-C plus D-C signals) received from the transmitter to detect coincidence of the received A-C signal derived from the positive half cycles of the A-C source at the transmitter, and the said first train of synchronizing pulses to produce a first output signal.

A second detecting means is provided at the receiver responsive to the composite signal from the transmitter to detect coincidence of the received half cycles derived from the negative half cycles of the A-C source at the transmitter and the said second train of synchronizing pulses to produce a second output signal.

The receiver further comprises a third detecting means responsive to a given one of said two D-C potentials to produce a third output signal.

In accordance with a feature of the invention, there is provided a fourth detecting means which is constructed to detect the second of said D-C potentials supplied from the transmitter to produce, at the receiver, a fourth output signal. Thus, various combinations of four different signals can be transmitted to the receiver, which determines which of the four signals are present in the received composite signal and produces output signals accordingly. Since four separately identifiable signals are utilized, and since they are binary in nature, i.e., each signal is either absent or present, it is possible to have a total of $2^4$ or 16 different combinations of signals. Suitable decoding means, such as a relay tree, for example, can be employed to decode and translate the output signals of the receiver into any one of sixteen possible choices (instructions).

The above-mentioned and other objects and features of the invention will be more fully understood from the following detailed description thereof when read in conjunction with the drawings in which.

Figure 1:
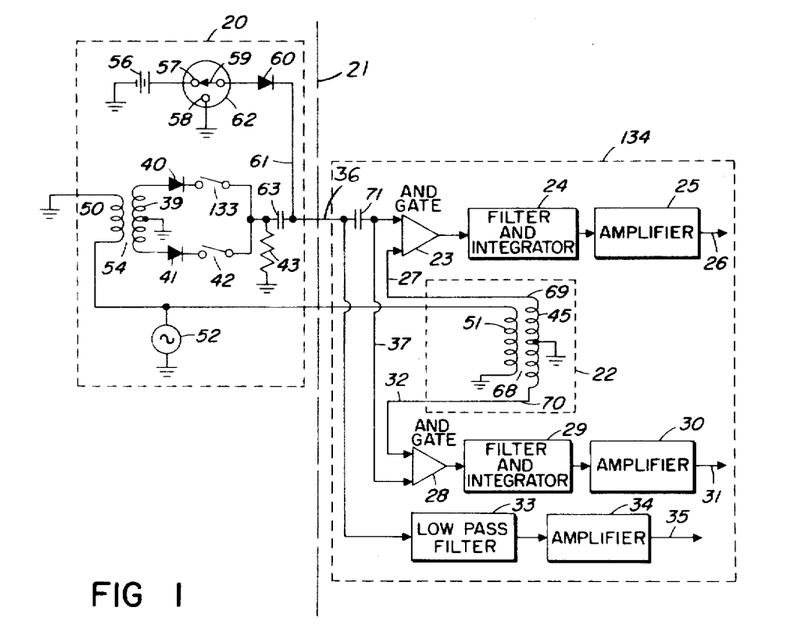
FIG. 1 is a combination schematic and block diagram of the invention.

Referring now to FIG. 1, the transmitter 20 is located to the left of the vertical dotted line 21, and the receiver 134 is located to the right of said dotted line 21. The transmission line means between the transmitter (remote control station) and the receiver is identified by reference character 36 and, as can be seen from FIG. 1, is a single transmission line.

Figure 3:
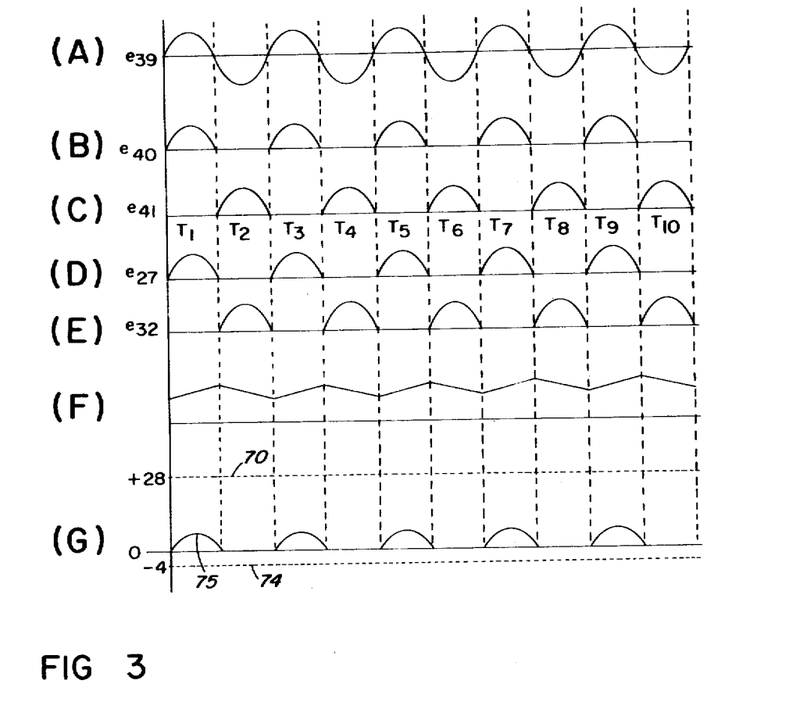
FIG. 3 shows curves representing voltages appearing at various points in the circuit; which curves will be employed to facilitate explanation of the circuits of FIGS. 1 and 2.

In the transmitter section of the invention, an A-C source 52 provides a signal frequency $f_1$ to the primary winding 50 of transformer 54. Diodes 40 and 41 are connected to opposite ends of the center tapped secondary winding 39 of transformer 54 and each functions to pass a positive train of pulses, which occur alternately, i.e., in an interleaved manner. The train of pulses passing through diode 40 is shown in the curve of FIG. 3B and the train of pulses passing through diode 41 is shown in the curve of FIG. 3C. The curve of FIG. 3A represents the voltage signal generated at the upper terminal of secondary winding 39.

Switches 133 and 42 are constructed to operate independently of each other to connect either the output of diode 40, or the output of diode 41, or both outputs, simultaneously to the transmission line 36.

To supply D-C potentials to the transmission line 36, there is provided a battery source 56, a switch 62, and a diode 60. The cathode of diode 60 is connected to transmission line 36 through lead 61. The armature 59 of switch 62 is operated independently of switches 133 and 42 to make contact with either the contact 57 or 58; thus providing either a positive potential or ground potential through the diode 60 to the transmission line 36. The positive battery source voltage 56 is represented by the straight line 70 in curve FIG. 3F, which figure will be described in more detail later herein in connection with the receiving portion of the circuit.

It will thus be noted that in the circuit of FIG. 1 there are eight possible arrangements of the switches 133, 42, and 62, to provide eight different composite signals being supplied to the transmission line 36.

The receiving circuit is constructed to respond to the composite signal from the transmitter to produce output signals on output lead 26, 31, or 35 in various combinations indicative of the particular composite signal received from the transmitter. For example, if switch 133 is the only switch that is closed, i.e., is conductive, with switches 42 and 62 being open, an output signal will appear only on output lead 26 of the receiver. If both switches 133 and 42 are closed and switch 62 opened, then output signals will appear on the output terminals 26 and 31 of the receiver.

As a third example, if the armature 59 of switch 62 is closed on contact 57, the switch 41 is open, and the switch 42 is closed, then output signals will appear on output leads 26 and 35, and no signal will appear on output lead 31.

In the receiver 134 there is provided a synchronizing signal source 22, which produces a first train of pulses on lead 27 and a second train of pulses on lead 32. These two trains of pulses are interleaved and are represented, respectively, by the waveforms FIGS. 3D and 3E.

It should be noted that while negative half cycles of the signal are actually generated in secondary winding 45 of transformer 68, only the positive half cycles are utilized in the circuit, as will be seen later. For this reason, the outputs appearing at the end terminals of secondary winding 45 are spoken of as a train of positive pulses. In point of fact, diodes 82 and 102 in leads 27 and 32 are poled in such a manner as to pass only the positive half cycles.

AND gates 23 and 28 are each constructed to produce an output signal in response to the coincidence of positive signals on the two input leads thereto. Since the positive portions of the signal appearing at the upper terminal 69 (lead 27) of secondary winding 45 coincides in time with the positive half cycles passed by diode 40 and switch 133, the AND gate 23 will be conductive during the odd time intervals T1, T3, T5, etc., as shown in FIG. 3D. A filtering and integrating circuit 24 is constructed to respond to the train of pulses produced at the output of AND gate 23 to produce a D-C voltage as represented by the curve of FIG. 3F. Such D-C voltage is then supplied to a suitable amplifier 25, and then to output lead 26.

In a similar manner, AND gate 28 is responsive to coincident positive pulses appearing on each of its input leads from the lower terminal 70 (lead 32) of secondary winding 45 and the output from diode 41 and switch 42 of the transmitter. Such coincident pulses will occur only when the switch 42 is closed. The positive pulses passing through diode 41 when switch 42 is closed, is represented by the waveform of FIG. 3C. Thus, AND gate 28 is conductive during the even time intervals $T_2$, $T_4$, $T_6$, etc. A filtering and integrating circuit 29 is responsive to the train of output pulses from AND gate 28 to produce a D-C voltage similar to that shown in FIG. 3F. Such D-C output voltage is amplified by suitable amplifying means 30 and supplied to output lead 31.

When the armature 59 of switch 62 is closed on contact 57, a positive D-C voltage is supplied through diode 60, lead 61, transmission line 36, and then to the input of low-pass filter 33. It is to be noted that such D-C voltage is not supplied to AND gates 23 and 28 due to the action of blocking capacitor 71. Neither is it supplied back to the A-C source of the transmitter due to the blocking action of capacitor 63.

The low-pass filter 33 is provided to block the pulsating signals supplied through diodes 40 or 41 and to pass only the D-C voltage supplied from battery 56 when armature 59 is closed on contact 57. Amplifier means 34 is responsive to such D-C voltage to produce a suitably amplified signal at output lead 35.

Thus, there is provided on output leads 26, 31, and 35, D-C voltages in accordance with the particular composite signal supplied from transmitter 20. Since there are three output leads 26, 31, and 35, there are eight possible combinations of signals which may appear on such output leads. Suitable decoding means, such as a relay tree or other circuits, well known in the art, can be provided to decode such signals into eight separate instructions.

Figure 2:
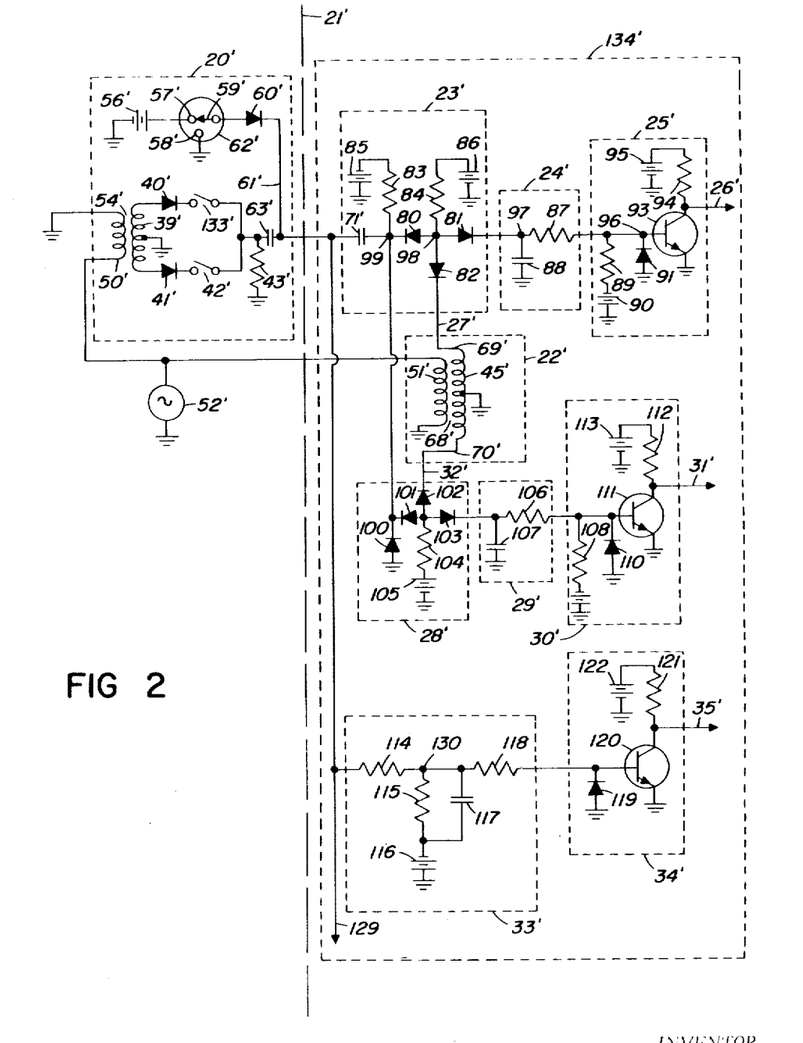
FIG. 2 is a schematic diagram of a preferred embodiment of the invention.

Referring now to FIG. 2, there is shown a detailed schematic diagram of a preferred form of the invention. Those elements of FIG. 2 which correspond to elements of FIG. 1 are identified by the same reference character, although primed. A further aid in correlating the schematic diagram of FIG. 2 with that of FIG. 1 is that the diagram of FIG. 2 is broken up into areas defined by dotted rectangularly shaped blocks which correspond to the blocks of FIG. 1, and identified by the same reference character, although primed.

In FIG. 2 the diagram of the transmitter is the same as in FIG. 1 and will not be described again. However, the receiving portion of this circuit is shown in detail and will be described.

The AND gates 23 and 33 of FIG. 2 are similar and are connected in parallel to input capacitor 71'. Similarly, the filter and integrator circuits 24 and 29 are the same, and amplifiers 25' and 35' are the same.

Since the receiving channel consisting of AND gate 23', filter and integrator 24' and amplifier 25' is the same as the receiving channel consisting of AND gate 28', filter and integrator circuit 29', and amplifier 30', only the first receiving channel will be described in detail.

In the absence of an incoming signal, junctions 98 and 99 of AND gate 23' are clamped at ground potential. More specifically, junction 98 is connected to ground through diode 82 in the upper winding 45' of the transformer 68'. The point 98 is also connected to positive 12-volt battery 86 through resistor 84. Thus, the potential of point 98 cannot rise above ground potential unless the terminal 69' of transformer secondary winding 45' rises positively above ground. Another condition which must be met before the potential of point 98 can rise above ground is discussed in the following paragraphs.

The junction 99 is also clamped to ground potential but in a slightly different manner from point 98. Where the potential of point 98 cannot go above ground potential in the absence of a positive signal on the upper terminal of transformer secondary winding 45', the potential of junction 99 cannot go below ground potential due to the presence of diode 100. It should further be noted, that junction 98 cannot rise above ground potential until the potential of junction 99 also rises above ground potential. Thus, raising the potential of junction 98 requires that two conditions be met. Firstly, the potential of junction 99 must be increased positively above ground potential due to the presence of an input signal from the transmitter and, secondly, the potential of the upper terminal 69' of transformer secondary winding 45' must also be positive.

The aforementioned two conditions are met as discussed in connection with FIG. 1 at times $T_1$, $T_3$, $T_5$, $T_7$, and $T_9$, as shown in the curves of FIG. 3. More specifically, the wavefor mof FIG. 3B is supplied to junction 99 from transmitter 20' and the waveform of FIG. 3D is supplied to junction 98 through diode 82 from transformer 68'. The signal then appearing at junction 98 is as shown by the pulsating waveform 75 of FIG. 3G. The pulsating waveform is supplied through diode 81 to filter and integrator circuit 24', which consists of resistor 87 and capacitor 88. The filtered signal is then supplied to the base of transistor 93 of amplifier 25'. Diode 91, resistor 89, and negative battery source 90 function as a clamping circuit to keep the voltage of the base of transistor 93 from drifting. More specifically, since the voltage drop across diode 91 is about .7 volt, the potential of the transistor base will, in the absence of an input signal from the transmitter, be maintained at approximately —.7 volt.

When a signal is being supplied from transmitter 20', the output of filter 24' at point 97 is a D-C voltage (see FIG. 3F, and of a magnitude of about 5 volts.

The resistor 94 is a conventional collector electrode load resistor and connects the collector electrode of the transistor to the positive voltage source 95. The output of transistor 93 is taken from the collector electrode via output lead 26'.

With respect to the channel consisting of AND gate 28', filter integrator circuit 29', and amplifier 30', the operation thereof is the same as just described except that it occurs on the alternate half cycles of the received input signal, as discussed in connection with FIG. 1.

Referring now to the lower portion of FIG. 2, there is shown the means for detecting the D-C component of the received signal, if such a D-C component should be present. The D-C component detecting circuit consists of low-pass filter 33' and amplifier 34'. The low-pass filter 33' in turn is comprised of resistor 114, resistor 115, resistor 118, capacitor 117, and negative battery source 116. Actually, the circuit within the circuitry within block 33' is something more than a simple filter circuit. More specifically, resistor 114 and resistor 115 form a voltage divider circuit for the purpose of decreasing the magnitude of the received signal at junction 130. Resistor 115 and capacitor 117 function as the primary filtering elements in the circuit. The resistor 118 functions primarily to limit the current supplied to the base of transistor 120.

When an A-C signal component is present in the received composite signal, the received composite signal will contain a D-C component caused by the unipolarity pulsating nature of said A-C signal. Such A-C component might function to drive the transistor 120 and produce a false output signal on output lead 35'. Means are provided in the filter circuit 33' to compensate for such unwanted D-C components. The only D-C signal desired to be detected is that originating from battery source 56' in the transmitter.

Such D-C signal compensating circuit functions as follows. The diode 119 is connected in series with resistor 118, resistor 115, and the battery 116 to ground. The component values are selected so that junction 130, in the absence of any received composite signal, is at about minus 4 volts, as shown by the curve 74 of FIG. 3G. Since the D-C component of a received A-C signal is approximately a positive four to five volts, cancellation of the unwanted D-C component is effected. The D-C voltage received from battery source 56' in transmitter 20' is of a considerably greater magnitude than the unwanted D-C component as, for example, approximately 28 volts. Such 28 volts of sufficient magnitude to overcome any bias appearing at junction 130 in the receiver and will drive transistor 120 to produce a true output signal on output lead 35'. The transistor 120 receives its collector voltage from battery source 122 through collector load resistor 121.

Figure 2A:
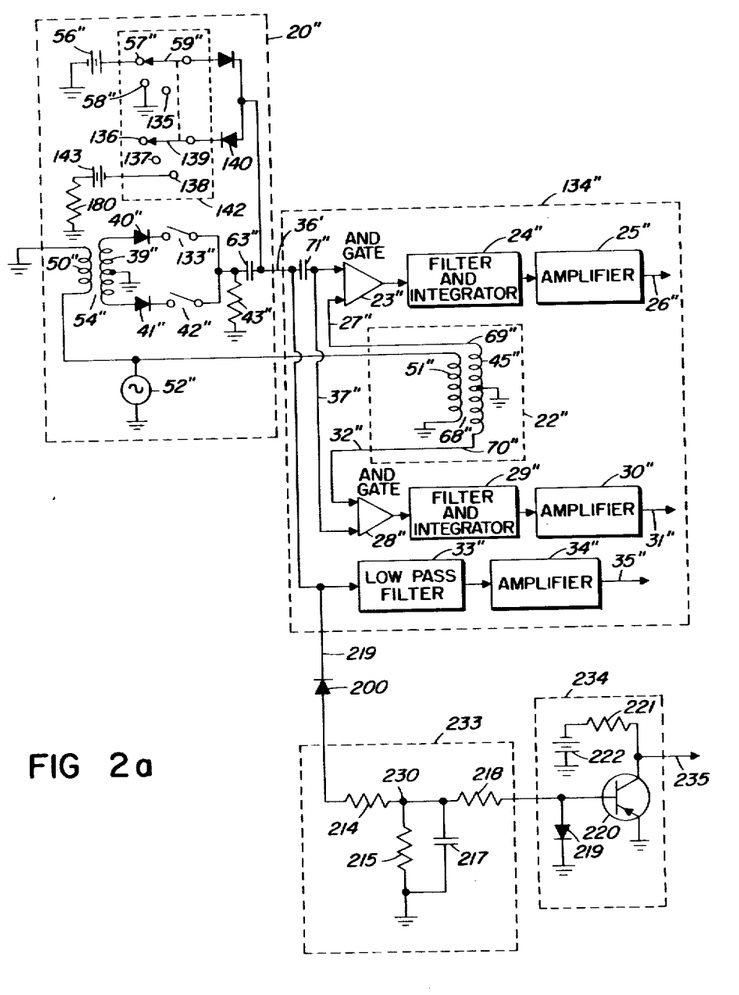
FIG. 2a is a schematic diagram of circuit means which can be added to the diagram of FIG. 2 to increase the capacity thereof.

In FIG. 2a there is shown a circuit for generating and detecting a negative D-C voltage signal in the event that more than eight instructions are needed. With the addition of the circuit of FIG. 2a a total of $2^4$=sixteen instructions are possible.

To generate the negative D-C voltage signal a modification of the switch 20 shown in FIG. 1 can be employed. Such a modification is shown in FIG. 2a and is included within block 142. The switch comprises two armatures 59" and 139, ganged together and each having three positions. The 57" and 58" associated with armature 59" correspond to similarly identified contacts of FIG. 1. The contact 135 represents an open condition of arm 59'.

The switches 136 and 137 associated with arm 139 are open positions and correspond to contact positions 57" and 58" of the upper half of the switch. Contact 138 is connected to negative battery source 143. Thus, when arm 139 makes with contact 138, the negative battery source will be supplied through diode 140, transmission line 36", and diode 200 to the negative D-C signal detecting means 233.

The negative D-C signal detecting means 233 and amplifying means 234 can be quite similar, in detailed circuitry, to that of the positive D-C signal detecting means shown in blocks 33' and 34' of FIG. 2, with differences to accommodate a negatively poled signal. Such differences include a PNP type transistor rather than an NPN type, and the cathode of diode 219 being connected to ground.

No battery source corresponding to battery source 116 of FIG. 2 is provided since any D-C signal derived from the transmitted A-C signal will be positive and will not pass through the diode 200 in the absence of a negative D-C signal from battery source 143. A negative D-C voltage transmitted from battery source 143 will be so much larger than the unwanted positive D-C component that no compensatory circuit is required in the particular embodiment of the circuit shown in FIG. 2a. In other embodiments such a compensatory circuit might be needed.

The function of all the elements of the negative D-C signal detector are substantially the same as that of the corresponding elements of blocks 33' and 34' of FIG. 2 with the exception of a D-C signal compensatory circuit, as noted above. It is to be noted that the reference characters for corresponding elements in blocks 33' and 34' of FIG. 2 and blocks 233 and 234 of FIG. 2a are the same except that in FIG. 2a the prefix "2" is employed. Thus, reference character 119 in FIG. 2 is 219 in FIG. 2a. From the low-pass filter circuit 131 the D-C signal is supplied to the amplifier 132.

More specifically, the low-pass filter circuit 233 of FIG. 2a is comprised of resistors 214, 215, and 218, capacitor 217. The resistors 214 and 215 form a voltage divider circuit to decrease the amplitude of the received signal, while resistor 218 functions to limit the driving current supplied to transistor 220. Resistor 215 and capacitor 217 function as the primary filtering elements.

The filtering circuit is included only to smooth out the negative A-C signal voltage when accompanied by an A-C component. More specifically, in the presence of a negative D-C voltage the diode 200 will be conductive, and the A-C signal will also pass therethrough.

The output of the filter circuit is supplied to transistor 220, the collector of which is connected to negative battery source 222 through a load resistor 221. The output signal is taken from the collector electrode via lead 160. Diode 219 functions to clamp the base potential of transistor 220 at a voltage of approximately +.7 of a volt. This potential can decrease below +.7 of a volt, but cannot increase above .7 volt.

Figure 4:
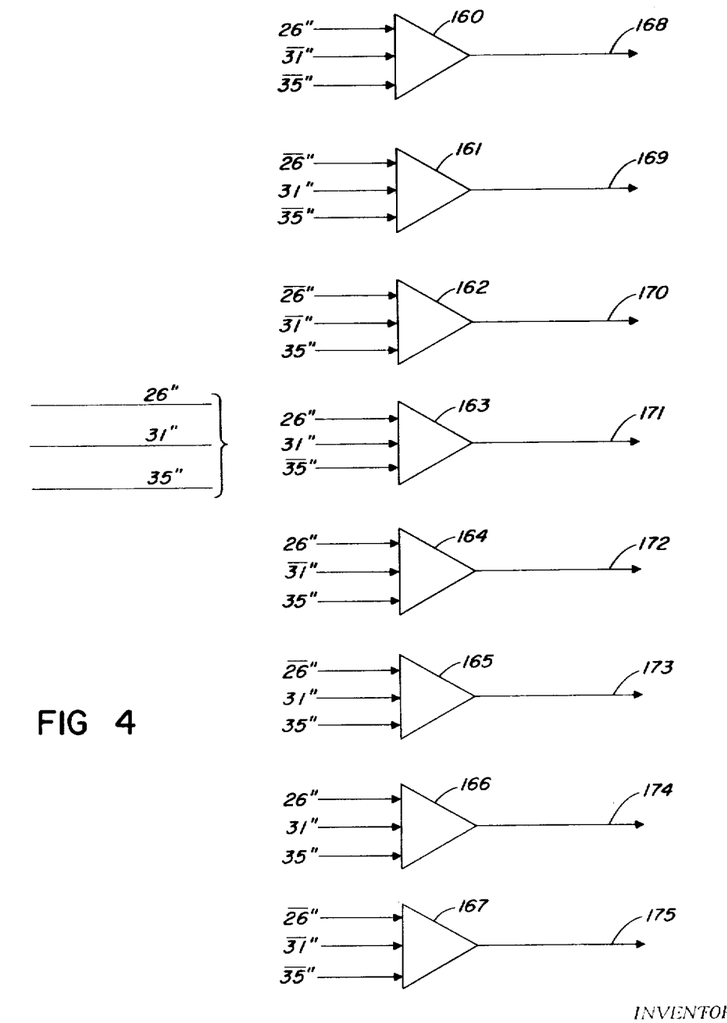
FIG. 4 is a logic diagram.

Referring now to FIG. 4, there is shown a logic diagram for decoding the various combinations of output signals detected by the receiver. Basically, the decoder of FIG. 4 comprises a group of eight AND gates 160–167, each of which has three inputs and which is responsive to a different combination of input signals. For example, AND gate 160 is responsive to an output signal on input lead 26'' and to a "not" output signal on input leads 31'' and 35''.

It should be noted that when any one of the receiver channels functions to detect a transmitted signal, the potential of such detected signal will be ground. This is more clearly seen from an examination of the operation of transistor 93 of FIG. 2, for example. In the quiescent stage, i.e., in the absence of a signal supplied to the base thereof, the collector potential will be positive since the transistor is nonconductive and presents a high impedance to battery source 95. However, when a positive pulse is supplied to the base electrode thereof, in response to a transmitted signal, the transistor 93 will become conductive and its impedance will drop to almost zero. Thus, the potential of the collector electrode will drop to near ground potential.

Consequently, in FIG. 4 the term "not" output signal indicates a potential positive with respect to ground, and the phrase "output signal" represents a potential near ground.

As another example of the operation of the decoder circuit of FIG. 4, AND gate 163 produces an output signal in response to output signals on leads 26' and 31'' and a "not" output signal on output lead 35''.

It will be observed that the AND gates have output terminals 168 through 175. There are eight such output terminals, giving a choice of one of eight instructions. The synchronizing pulse source 22 functions as a clock pulse source to make possible the use of all eight combinations.

For example, a three-phase A-C signal can be employed at the transmitter, thus providing six trains of pulses shifted in phase with respect to each other in multiples of 60°. Coupled with the positive and negative D-C signals, a possibility of a total of $2^8$ or 256 different instructions can be transmitted. However, such an arrangement will require a somewhat more refined clock pulse arrangement and will probably involve sampling the received A-C signals and, perhaps, employing an amplitude threshold detecting circuit. However, such circuits are well known within the art and easily designed by one skilled in the art and are considered to be included within the scope of the present invention.

Additionally, it should be noted that the switches, such as switches 62, 133, and 42 of FIG. 1 and the corresponding switches of FIGS. 2 and 2a, can be electronic switches such as, for example, AND gates operable under control of a computer program so that the ultimate instructions delivered by the decoder to a controlled equipment are under the direct control of the computer program. When AND gates are employed, it is expedient to incorporate flip-flop circuits under computer control, one flip-flop for each AND gate, which flip-flops function to supply to one of the inputs of each individual AND gate, thereby causing the AND gates to become conductive and act as switches.

I claim:
1. A data transmission system comprising:
 transmitting station means;
 transmission means; and
 receiving means;
 said transmitting means comprising first generating means for supplying a plurality of trains of pulses to said transmission means, with the pulses of each train occurring at regular intervals, and with the pulses of each train being phase displaced from the pulses of each other train of pulses;
 said transmitting means further comprising second generating means for supplying a D-C voltage signal to said transmission means;
 said receiving means comprising:
  synchronizing signal source means constructed to generate a plurality of synchronizing signals individually synchronous with the pulses of a particular one of said trains of pulses;
  a first plurality of detecting means each responsive to a particular train of pulses and a particular synchronizing signal to produce an output signal; and
  second detecting means responsive to said D-C signal to produce an output signal.

2. A data transmission system in accordance with claim 1 in which:
 each of said first plurality of detectors comprises AND gate means responsive to coincidence of the pulses of a particular train of pulses and the synchronizing signal synchronous therewith to produce an output signal;
 and in which each of said second detectors comprises filtering means for responding to a composite signal including A-C and D-C voltage signal components to filter out the A-C components and produce an output signal in response to said D-C voltage signal component.

3. A data transmission means in accordance with claim 2 in which:
 each of said first plurality of detecting means further comprises filtering and integrating means responsive to said AND gate means to produce a D-C output signal.

4. A data transmission system in accordance with claim 3 comprising:
 decoding means having $2^n$ output terminals and responsive to the output signals of said plurality of first detector means and the output signal of said second detector means to select one of said $2^n$ output terminals, where $n=$ the total number of output signals.

5. A data transmission system in accordance with claim 4 in which:
 said first generating means comprises first switching means for independently and selectively connecting or disconnecting each of the said trains of pulses to said transmission means;
 and in which said second generating means comprises second switching means for independently and selectively connecting or disconnecting said D-C voltage signal to said transmission means.

6. A data transmission system comprising:
 transmitting station means;
 transmission means; and
 receiving means;
 said transmitting means comprising first generating means for generating and supplying trains of pulses to said transmission means, with the pulses of each train occurring at a constant periodicity, and further with the pulses of each train being phase displaced from each other;
 said transmitting means further comprising second generating means for generating and supplying D-C signals to said transmission means;
 said receiving means comprising:
  first detecting means having X output leads and selectively responsive to each of said trains of pulses to produce output signals on selective ones of its X output leads in accordance with the particular pulse trains being transmitted; and
  second detecting means having Y output lead means and responsive to said D-C signals to produce output signals on said Y output lead means in accordance with the D-C signals being transmitted.

7. A data transmission system in accordance with claim 6 in which:
said receiving means comprises synchronizing generating means for generating a synchronizing signal for each of said trains of pulses.

8. A data transmission system in accordance with claim 7 in which:
said first detector means comprises a plurality of AND gate means responsive to the coincidence of the pulses of a particular train of pulses and the synchronizing signal synchronous therewith to produce an output signal;
and in which each of said second detecting means comprises filtering means for responding to a composite signal including A-C and D-C voltage signal components to filter out the A-C components and produce an output signal in response to said D-C voltage signal component.

9. A data transmission means in accordance with claim 8 in which:
each of said first plurality of detecting means further comprises filtering and integrating means responsive to said AND gate means to produce a D-C output signal.

10. A data transmission system in accordance with claim 9 comprising:
decoding means having $2^n$ output terminals and responsive to the output signals of said plurality of first detecting means and the output signal of said second detecting means to select one of said $2^n$ output terminals, where $n$=the total number of output signals.

11. A data transmission system in accordance with claim 10 in which:
said first generating means comprises first switching means for independently and selectively connecting or disconnecting the said trains of pulses to said transmission means;
and in which said second generating means comprises second switching means for independently and selectively connecting or disconnecting said D-C signals to said transmission means.

12. A data transmission system comprising:
transmitting station means;
transmission means; and
receiving means;
said transmitting means comprising first generating means for generating and supplying at least two trains of pulses to said transmission means, with the pulses of each train occurring at a regular rate, and further with the pulses of each train being phase displaced from each other;
said transmitting means further comprising a second generating means for generating and supplying to said transmission means one of two levels of D-C signal;
said receiving means comprising:
first detecting means having at least two output leads and selectively responsive to each of said trains of pulses to produce output signals on said output leads in accordance with the particular pulse train being transmitted;
said second detecting means having an output lead and responsive to the levels of said D-C signal to produce output signals on said output lead in accordance with the D-C level signal being transmitted.

13. A data transmission system in accordance with claim 12 in which:
said receiving means comprises synchronizing signal generating means for generating a synchronizing signal for each of said trains of pulses.

14. A data transmission system in accordance with claim 13 in which:
said first detector means comprises a plurality of AND gate means, each responsive to coincidence of the pulses of a particular train of pulses and the synchronizing signal synchronous therewith to produce an output signal;
and in which each of said second detecting means comprises filtering means for responding to a composite signal including A-C and D-C voltage signal components to filter out the A-C components and produce an output signal in response to said D-C voltage signal component.

15. A data transmission means in accordance with claim 14 in which:
said first detecting means further comprises filtering and integrating means responsive to said AND gate means to produce D-C output signal on its output leads in accordance with the particular combination of trains of pulses transmitted.

16. A data transmission system in accordance with claim 15 comprising:
decoding means having $2^n$ output terminals and responsive to the output signals of said plurality of first detector means and the output signal of said second detector means to select one of said $2^n$ output terminals, where $n$=the total number of output signals.

17. A data transmission system in accordance with claim 16 in which:
each of said first plurality of generating means comprises first switching means for independently and selectively connecting or disconnecting the said trains of pulses to said transmission means;
and in which said second generating means comprises second switching means for independently and selectively connecting or disconnecting said D-C signals to said transmission means.

References Cited
UNITED STATES PATENTS

| | | | |
|---|---|---|---|
| 1,672,005 | 6/1928 | Sorenson | 340—147 |
| 2,640,188 | 5/1953 | Kienast. | |
| 2,973,509 | 2/1961 | Majerus et al. | 340—354 X |

JOHN W. CALDWELL, *Primary Examiner.*

J. T. STRATMAN, *Assistant Examiner.*

UNITED STATES PATENT OFFICE

CERTIFICATE OF CORRECTION

Patent No. 3,355,548 November 28, 1967

Richard M. Hodge

It is hereby certified that error appears in the above numbered patent requiring correction and that the said Letters Patent should read as corrected below.

Column 9, line 6, after "Synchronizing" insert -- signal --

Signed and sealed this 7th day of January 1969.

(SEAL)
Attest:

Edward M. Fletcher, Jr.
Attesting Officer

EDWARD J. BRENNER
Commissioner of Patents